Figure 6:
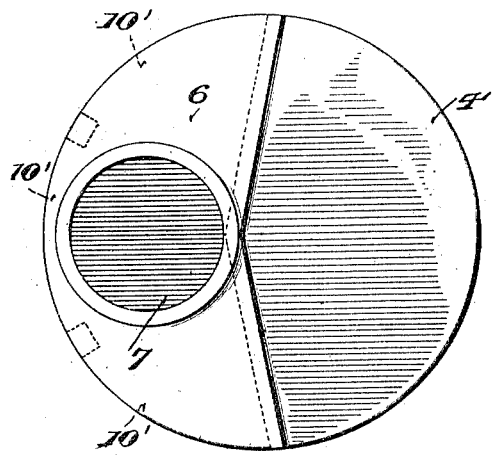

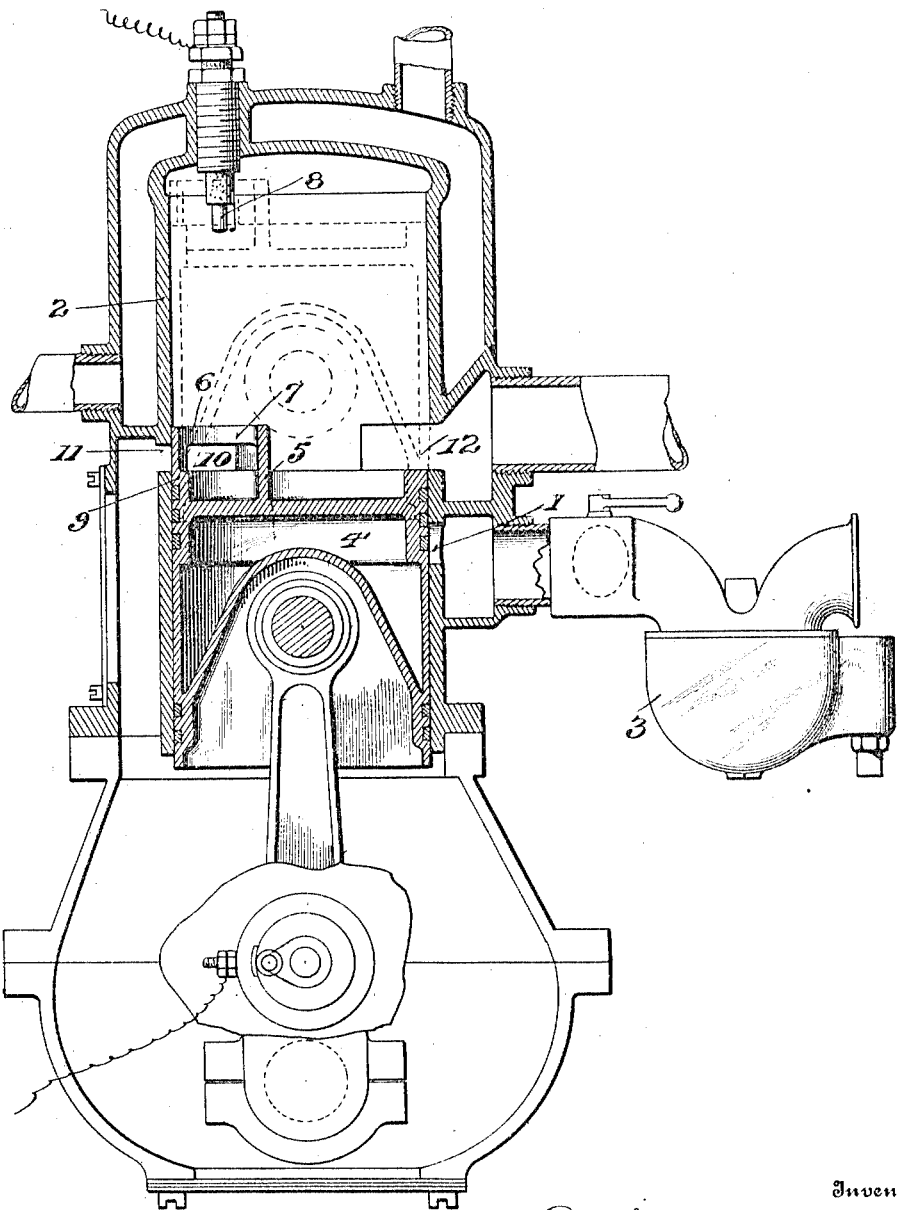

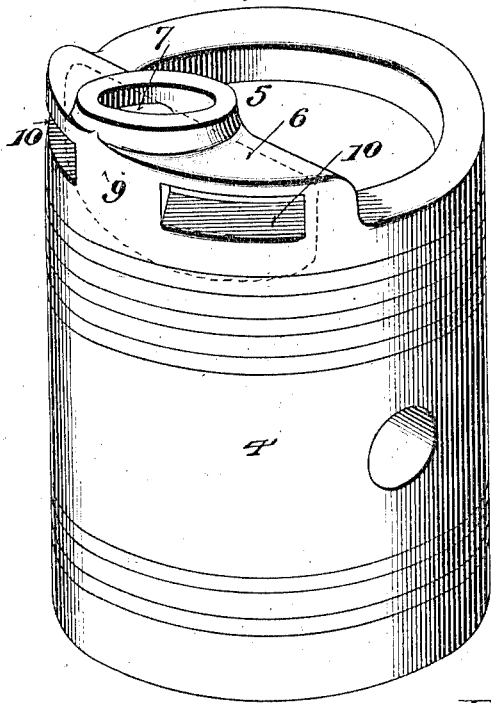
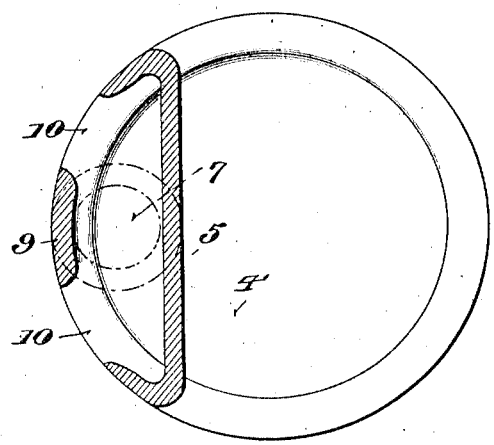
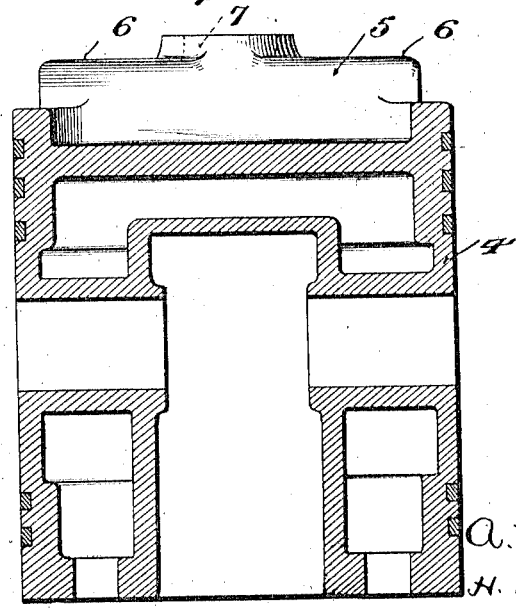

A. WINTON & H. B. ANDERSON.
TWO-CYCLE ENGINE.
APPLICATION FILED JAN. 20, 1908.

1,061,796.

Patented May 13, 1913.

3 SHEETS—SHEET 3.

Inventor
A. Winton,
H. B. Anderson,
By A. S. Pattison,
Attorney

Witnesses

UNITED STATES PATENT OFFICE.

ALEXANDER WINTON AND HAROLD B. ANDERSON, OF CLEVELAND, OHIO, ASSIGNORS TO THE WINTON MOTOR CARRIAGE COMPANY, OF CLEVELAND, OHIO.

TWO-CYCLE ENGINE 1,061,796.    Specification of Letters Patent.    Patented May 13, 1913.

Application filed January 20, 1908. Serial No. 411,753.

*To all whom it may concern:*

Be it known that we, ALEXANDER WINTON and HAROLD B. ANDERSON, citizens of the United States, residing at Cleveland, in the county of Cuyahoga and State of Ohio, have invented certain new and useful Improvements in Two-Cycle Engines, of which the following is a specification, reference being had therein to the accompanying drawing.

This invention relates to improvements in two-cycle engines, and the primary object is to insure certainty of explosion when very small charges are admitted by reason of a partially closed throttle when running at low speeds under load, and when running idle, whereby the "missing" of explosions is prevented, and perfect control, flexibility and uniform operation under all speeds and loads is obtained.

It is well known to those skilled in the art, that in two-cycle engines when running at low speeds with throttle positioned for small charges, the engine "misses" which produces irregularity of running. The "missing" is caused by reason of the fact that at the time the inlet port is uncovered, the cylinder is full of burned charge at approximately atmospheric pressure, and the deflector, or whatever is used to prevent the mixing of the new and the old charges, very poorly serves its purpose. As a result, the small amount of fresh charge admitted mixes to some extent with the burned charge, which dilutes the mixture to be fired very much. It is this condition of operating on throttle at low speeds with load, and running idle, that has been one of the chief difficulties with two-cycle motors. When working with throttle partially closed for low speeds, the charge admitted to the cylinder is so very small that the chances are it will not reach the spark plug where it can be fired, or that portion which does reach the spark plug is too diluted to be ignited. We overcome this defect by providing the piston with a pocket into which the small fresh charge is conveyed and retained, against any mixture with the burned charge, and to so position the spark plug that it enters into this pocket, and therefore extends directly into the fresh undiluted small charge, and insures ignition thereof, irrespective of the size of the charge. The pocket is made of such a size as to prevent any of the burned charge entering it to be mixed with the fresh small charge. By this means the small fresh charge is maintained in a vertical column which has no opportunity to be diluted by the remaining burned charge, and the spark plug entering this column of fresh gas, insures an ignition and explosion, and prevents "missing" and therefore irregular running under low speeds.

Figure 7:
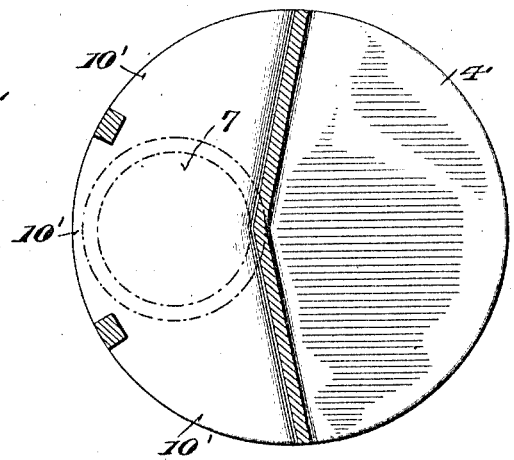
Figure 5:
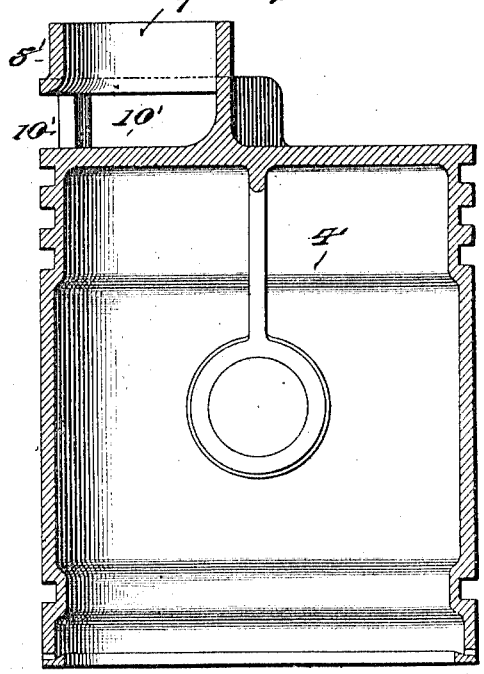

In the accompanying drawings, Figure 1, is a vertical, sectional view of a two-cycle engine with the present improvement applied thereto. Fig. 2, is a detached, enlarged, perspective view of the piston which contains the present improvement. Fig. 3, is a horizontal sectional view through the fresh charge pocket of Figs. 1, 2 and 4. Fig. 4, is a longitudinal central sectional view of the piston of Figs. 1 and 2, looking toward the fresh charge pocket. Fig. 5, is a longitudinal, sectional view of a non-recessed piston. Fig. 6, is a top, plan view of Fig. 5. Fig. 7, is a horizontal sectional view through the fresh charge pocket of Figs. 5 and 6.

For the purpose of illustrating the present invention, the drawings show what is commonly known as a three-port type of two-cycle engine, in which the gas is sucked into the base or crank-case, compressed therein, transferred to the cylinder above the piston, fired and exhausted in a manner well understood by those skilled in this art. In this three-port type, the gas does not enter the base continuously on the up stroke, but when the piston is very near the upper end of the cylinder it uncovers the port 1 of the cylinder 2, which communicates with a carbureter 3, and air rushes through the carbureter due to the partial vacuum formed in the crank-case by the upward movement of the piston.

The present improvement pertains to the construction of the piston 4, and consists in providing the explosion end of the piston with a vertically-projecting gas pocket 5, which has a covering 6, and the cover is provided with an opening 7 which performs the double function of establishing communication between the pocket and the cylinder, and to provide a passage-way through which the spark-plug 8 projects into said pocket when the piston is at or near its upper or outer position. As shown in Fig. 1, the spark-plug projects into the pocket below the cover thereof, and to near the bottom of the pocket when the piston is in its outermost position. Formed in the outer wall 9 of the pocket is one or more inlet ports 10 which communicate with the pocket, and are adapted to register with the explosive inlet port 11 of the cylinder. Preferably this pocket is located at the opposite side of the piston from the exhaust port 12, of the cylinder, as the column of gas in the pocket is less disturbed by whatever movement there is in the passing out of the exhaust gases while the new charge is passing into the pocket.

By means of a pocket as here shown, the fresh charge of undiluted gas, however small, will be sufficient to scavenge the pocket of the burned charge, and the small column of fresh charge is carried upward to and surrounds the spark plug, but insures certainty of firing every charge however small.

For slow speeds, the spark lead is set to cause a spark at about the time when the piston is at or near its limit of inward stroke, but owing to the depth of the pocket, and the extension of the spark-plug thereinto, there is a permissible range of adjustment of the time of spark to meet all practical requirements for closed throttle operation, which condition this invention is designed to meet.

It is of course understood by those skilled in this art, that when operating with the throttle open and at high speeds, the spark would occur at a time before the pocket reaches the spark-plug, but with open throttle, the new charge is sufficiently large to so displace the burned charge that it will reach the spark-plug independently of the pocket, and the spark-plug projects into the pocket sufficiently far to permit a spark lead travel of the piston while the plug is still within the pocket for low speed purposes. The term "spark lead travel" means that the spark may occur before the piston reaches its outward limit of movement, and yet while the spark plug is within the fresh charge pocket, and by providing for this "spark lead travel" of the piston, the spark may occur when the engine crank shaft is at an angle and yet cause the spark within the fresh charge pocket.

By means of a vertical pocket with a cover having a spark-plug receiving opening, the fresh charge is sure to be pocketed and delivered to and around the spark-plug in a vertical column, no matter how small the charge, and ignition is certain to occur. We are aware that some efforts along this line have heretofore been made, but in such instances the pocket and the spark-plug were not constructed and arranged as here shown, and were not capable of delivering an undiluted small charge of gas in the form of a vertical column to and around the spark-plug, and to insure the firing of every charge no matter how small.

Figs. 5, 6 and 7 show a slight modification of the invention disclosed in Figs. 1 to 4, in that the fresh charge pocket 5′, and the inlet ports 10′, are larger, and the upper end of the piston is not recessed.

Having thus described this invention, what is claimed and desired to be secured by Letters Patent, is:—

1. The combination in a two-cycle explosion engine, of a cylinder having inlet and exhaust ports, a piston having a vertically-arranged fresh charge pocket having a port adapted to register with said inlet port and in its top a spark plug receiving opening, and a spark-plug carried by the cylinder and adapted to project into said pocket to a point near its bottom for the purpose described.

2. The combination in a two-cycle explosion engine, of a cylinder having inlet and exhaust ports, a piston having a relatively small vertically-arranged fresh charge pocket having a laterally-arranged inlet port adapted to register with said cylinder inlet port and a vertically-arranged spark-plug receiving opening, of a spark-plug carried by the cylinder and extending in a direction longitudinal the piston and projecting into the pocket to near its bottom when the piston is in its outermost position.

3. The combination in a two-cycle explosive engine, of a cylinder having inlet and exhaust ports, a piston having a vertically-arranged pocket having an inlet port adapted to register with said cylinder inlet port and a cover, the cover having a combined outlet and spark-plug receiving port, and a spark-plug carried by the cylinder and adapted, to project into the pocket below said cover when the piston is in its outermost position.

4. The combination in a two-cycle explosive engine, a cylinder having an inlet port, and an exhaust port at the opposite side from the inlet port, a piston having a vertically-arranged fresh charge pocket at the inlet port side, said pocket having an inlet port adapted to register with said cylinder inlet port and a cover, the cover provided with a spark-plug passage-way, and a spark-plug carried by the cylinder and projecting thereinto to a point inside of the cover pocket when the piston is at or near its uppermost position.

5. The combination in a two-cycle explosion engine, of a cylinder having inlet end exhaust ports, a piston having at its explosion end a relatively small fresh charge pocket having a side entrance adapted to register with said cylnder inlet port and a spark plug receiving opening, of a spark plug projecting into said cylinder and located to enter said fresh charge pocket when the piston is in its outermost position.

6. The combination in a two-cycle explosive engine, of a cylnder, a piston having a vertically-arranged fresh-charge pocket having a fresh charge inlet port and a spark-plug-receiving opening, and a spark-plug carried by the cylinder and projecting thereinto in a line with the spark-plug opening of the pocket, and adapted to enter the said pocket when the piston is in its outermost position, for the purpose described.

In testimony whereof we affix our signatures in presence of two witnesses.

ALEXANDER WINTON.
HAROLD B. ANDERSON.

Witnesses:
O. F. BAUGHMAN,
AMOS S. NEWTON.

---

Copies of this patent may be obtained for five cents each, by addressing the "Commissioner of Patents, Washington, D. C."